(12) United States Patent
Li et al.

(10) Patent No.: US 11,747,144 B2
(45) Date of Patent: Sep. 5, 2023

(54) REAL TIME ROBUST LOCALIZATION VIA VISUAL INERTIAL ODOMETRY

(71) Applicant: Agency for Science, Technology and Research, Singapore (SG)

(72) Inventors: Zhengguo Li, Singapore (SG); Jinghong Zheng, Singapore (SG); Zijian Orson Zhu, Singapore (SG); Qinyuan Ren, Singapore (SG); Kong Wah Wan, Singapore (SG); Wei Yun Yau, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 564 days.

(21) Appl. No.: 16/498,721

(22) PCT Filed: Mar. 29, 2018

(86) PCT No.: PCT/SG2018/050153
§ 371 (c)(1),
(2) Date: Sep. 27, 2019

(87) PCT Pub. No.: WO2018/182524
PCT Pub. Date: Oct. 4, 2018

(65) Prior Publication Data
US 2020/0025570 A1    Jan. 23, 2020

(30) Foreign Application Priority Data
Mar. 29, 2017    (SG) .......................... 10201702561Y (51) Int. Cl.
*G01C 21/16*    (2006.01)
*G06T 7/246*    (2017.01)
(Continued)

(52) U.S. Cl.
CPC ....... *G01C 21/1656* (2020.08); *G01C 21/188* (2020.08); *G05D 1/0253* (2013.01);
(Continued)

(58) Field of Classification Search
CPC ......... G01C 21/165; G06T 7/246; G06T 7/73; G06T 2207/30244; G05D 1/0253
See application file for complete search history.

(56) References Cited

U.S. PATENT DOCUMENTS

| 4,442,491 | A | * | 4/1984 | Olhausen, Jr. | ......... G09B 9/003 |
|           |   |   |        |               | 434/30               |
| 5,672,872 | A | * | 9/1997 | Wu            | ......... F41G 3/326 |
|           |   |   |        |               | 250/330              |

(Continued)

FOREIGN PATENT DOCUMENTS

| CN | 103345751 A    | 10/2013 |
| WO | 2016187757 A1  | 12/2016 |

OTHER PUBLICATIONS

International Search Report for International Application No. PCT/SG2018/050153 dated Jun. 20, 2018, pp. 1-4.

(Continued)

*Primary Examiner* — Fadey S. Jabr
*Assistant Examiner* — Naeem Taslim Alam
(74) *Attorney, Agent, or Firm* — Shackelford, Bowen, McKinley & Norton, LLP (57) ABSTRACT

A camera-based localization system is provided. The camera-based localization system may assist an unmanned vehicle to continue its operation in a GPS-denied environment with minimal increase in vehicular cost and payload. In one aspect, a method, a computer-readable medium, and an apparatus for localization via visual inertial odometry are provided. The apparatus may construct an optical flow based on feature points across a first video frame and a second (Continued)

video frame captured by a camera of the apparatus. The apparatus may refine the angular velocity and the linear velocity corresponding to the second video frame via solving a quadratic optimization problem constructed based on the optical flow, the initial values of the angular velocity and the linear velocity corresponding to the second video frame. The apparatus may estimate the pose of the apparatus based on the refined angular velocity and the refined linear velocity.

20 Claims, 5 Drawing Sheets

(51) Int. Cl.
  *G06T 7/73* (2017.01)
  *G05D 1/02* (2020.01)
(52) U.S. Cl.
  CPC ............... *G06T 7/246* (2017.01); *G06T 7/73* (2017.01); *G06T 2207/30244* (2013.01)

(56) References Cited

U.S. PATENT DOCUMENTS

| | | | | |
|---|---|---|---|---|
| 5,774,832 | A * | 6/1998 | Vanderwerf | G01P 7/00 701/504 |
| 10,093,355 | B1 * | 10/2018 | Wang | E02F 9/2045 |
| 10,096,114 | B1 * | 10/2018 | Lasenby | H04N 17/002 |
| 10,151,588 | B1 * | 12/2018 | Singh | G06T 7/246 |
| 10,496,104 | B1 * | 12/2019 | Liu | G06T 5/006 |
| 10,502,840 | B2 * | 12/2019 | Niesen | G01S 19/47 |
| 2006/0235610 | A1 * | 10/2006 | Ariyur | G01C 21/005 701/533 |
| 2007/0122001 | A1 * | 5/2007 | Wang | G06V 40/164 382/103 |
| 2007/0216675 | A1 * | 9/2007 | Sun | G06T 11/00 348/51 |
| 2008/0195316 | A1 | 8/2008 | Krishnaswamy | |
| 2009/0225300 | A1 * | 9/2009 | Barrows | G01P 3/36 356/28.5 |
| 2010/0007550 | A1 * | 1/2010 | Nagamiya | G01C 21/165 342/357.38 |
| 2010/0305784 | A1 * | 12/2010 | Anderson | G01C 23/005 701/9 |
| 2011/0285590 | A1 * | 11/2011 | Wellington | G01S 19/53 342/417 |
| 2013/0076915 | A1 * | 3/2013 | Ramachandran | G06T 7/207 348/207.1 |
| 2013/0121597 | A1 * | 5/2013 | Hsu | H04N 5/21 382/201 |
| 2014/0029837 | A1 * | 1/2014 | Venkatraman | H04N 23/676 382/154 |
| 2014/0104445 | A1 * | 4/2014 | Ramachandran | G01C 25/00 348/208.2 |
| 2014/0270484 | A1 * | 9/2014 | Chandraker | G06T 7/246 382/154 |
| 2014/0320593 | A1 * | 10/2014 | Pirchheim | H04N 13/289 348/36 |
| 2014/0341465 | A1 * | 11/2014 | Li | G01C 21/1656 382/160 |
| 2015/0098645 | A1 * | 4/2015 | Leung | G06T 7/55 382/154 |
| 2015/0103199 | A1 * | 4/2015 | Pau | G06T 7/97 348/222.1 |
| 2015/0145983 | A1 * | 5/2015 | Akashi | G02B 21/367 348/80 |
| 2015/0154468 | A1 * | 6/2015 | Li | G06T 5/008 382/197 |
| 2016/0048978 | A1 * | 2/2016 | Jachalsky | G06T 7/579 382/195 |
| 2016/0086336 | A1 * | 3/2016 | Lin | G06T 7/74 348/50 |
| 2016/0112701 | A1 * | 4/2016 | Chao | H04N 23/6812 348/187 |
| 2016/0379092 | A1 * | 12/2016 | Kutliroff | G06T 7/73 382/158 |
| 2017/0038213 | A1 * | 2/2017 | Han | G01C 21/183 |
| 2017/0038405 | A1 * | 2/2017 | Zhou | G06T 7/246 |
| 2017/0131096 | A1 * | 5/2017 | Karlov | G01C 21/02 |
| 2017/0212529 | A1 * | 7/2017 | Kumar | G01C 21/20 |
| 2017/0278219 | A1 * | 9/2017 | Yuan | H04N 21/44 |
| 2017/0287162 | A1 * | 10/2017 | Wasik | G06T 7/73 |
| 2017/0336517 | A1 * | 11/2017 | Petillon | G01S 19/49 |
| 2017/0343356 | A1 * | 11/2017 | Roumeliotis | G01C 21/1656 |
| 2018/0052006 | A1 * | 2/2018 | Ell | G01P 21/00 |
| 2018/0109767 | A1 * | 4/2018 | Li | G05D 1/101 |
| 2018/0112985 | A1 | 4/2018 | Madison | |
| 2018/0164122 | A1 * | 6/2018 | Rimoux | G06T 7/579 |
| 2018/0164124 | A1 * | 6/2018 | Viswanathan | B64D 47/08 |
| 2018/0259341 | A1 * | 9/2018 | Aboutalib | G06T 7/74 |
| 2019/0113537 | A1 * | 4/2019 | Zhou | G01C 25/00 |
| 2019/0346562 | A1 * | 11/2019 | Peng | G01S 13/86 |
| 2019/0360802 | A1 * | 11/2019 | Shimaji | G01B 21/22 |

OTHER PUBLICATIONS

Written Opinion of the International Searching Authority for International Application No. PCT/SG2018/050153 dated Jun. 20, 2018, pp. 1-7.

Baker et al., "Lucas-Kanade 20 Years on: A Unifying Framework: Part 1," International Journal of Computer Vision, vol. 56, No. 3, 2002, pp. 221-255.

Carrillo et al., "Combining Stereo Vision and Inertial Navigation System for a Quad-Rotor UAV," Journal of Intelligent & Robotic Systems, vol. 65, No. 1-4, Aug. 17, 2011, pp. 373-387.

Lynen et al., "Tightly Coupled Visual-Intertial Navigation System Using Optical Flow," IFAC Proceedings, vol. 46, No. 30, Dec. 31, 2013, pp. 251-256.

Strydom et al., "Visual Odometry: Autonomous UAV Navigation Using Optic Flow and Stereo," Proceedings of Australasian Conference on Robotics and Automation, The University of Melbourne, Melbourne, Australia, Dec. 2-4, 2014, pp. 1-10.

Lupton et al., "Visual-Intertial-Aided Navigation for High-Dynamic Motion in Built Environments Without Initial Conditions," IEEE Transactions on Robotics, vol. 28, No. 1, Feb. 2012, pp. 61-76.

* cited by examiner

REAL TIME ROBUST LOCALIZATION VIA VISUAL INERTIAL ODOMETRY

CROSS-REFERENCE TO RELATED APPLICATION(S)

This application claims the benefit of Singapore Patent Application No. 10201702561Y, entitled "Real Time Robust Localization via Visual Inertial Odometry" and filed on Mar. 29, 2017, which is expressly incorporated by reference herein in its entirety.

TECHNICAL FIELD

Various aspects of this disclosure generally relate to localization systems, and more particularly, to a camera-based localization system.

BACKGROUND

It is important for a moving device (e.g., robot, unmanned vehicle, etc.) to be able to navigate in its environment. The moving device may be able to determine its own position and then to plan a path towards a goal location. Localization enables the moving device to establish its own position and orientation within its frame of reference.

An inertial measurement unit (IMU) is an electronic device that measures and reports a body's specific force, angular rate, and sometimes the magnetic field surrounding the body, using a combination of accelerometers and gyroscopes, sometimes also magnetometers. IMUs are typically used to maneuver aircraft, including unmanned aerial vehicles (UAVs), among many others, and spacecraft, including satellites. An IMU allows a GPS receiver to work when GPS-signals are unavailable, such as in tunnels, inside buildings, or when electronic interference is present.

Visual odometry is the process of determining the position and orientation of a moving device by analyzing the associated camera images. If an inertial measurement unit is used within the visual odometry system, it is commonly referred to as visual inertial odometry (VIO).

SUMMARY

The following presents a simplified summary in order to provide a basic understanding of various aspects of the disclosed invention. This summary is not an extensive overview of all contemplated aspects, and is intended to neither identify key or critical elements of all aspects nor delineate the scope of any or all aspects. The sole purpose is to present some concepts of one or more aspects in a simplified form as a prelude to the more detailed description that is presented later.

In one aspect of the disclosure, a method, a computer-readable medium, and an apparatus for localization via visual inertial odometry are provided. The apparatus may determine a first linear velocity of the apparatus and a first rotation matrix corresponding to a first video frame captured by a camera of the apparatus. The apparatus may estimate a second linear velocity of the apparatus corresponding to a second video frame captured by the camera based on the first linear velocity, the first rotation matrix, and an initial angular velocity of the apparatus corresponding to the second video frame. The angular velocity corresponding to the second video frame may be provided by an inertial measurement unit of the apparatus. The apparatus may construct an optical flow based on feature points across the first video frame and the second video frame. The apparatus may refine the angular velocity and the second linear velocity via solving a quadratic optimization problem constructed based on the optical flow, the estimated second linear velocity, and the angular velocity provided by the inertial measurement unit. The apparatus may estimate a pose of the apparatus corresponding to the second video frame based on the refined angular velocity and the refined second linear velocity corresponding to the second video frame.

In some embodiments, the apparatus may reduce the drift of the estimated pose corresponding to the second video frame using the nearest key frame of the second video frame. In such embodiments, to reduce the drift of the estimated pose, the apparatus may calculate initial values of a second rotation matrix and translation vector of the second video frame, select the nearest key frame of the second video frame, and refine the pose corresponding to the second video frame using feature points in a common captured region between the second video frame and the nearest key frame.

To the accomplishment of the foregoing and related ends, the aspects disclosed include the features hereinafter fully described and particularly pointed out in the claims. The following description and the annexed drawings set forth in detail illustrate certain features of the aspects of the disclosure. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various possible configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of a camera-based localization system will now be presented with reference to various apparatus and methods. The apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In the disclosure, a camera-based localization system is provided. The camera-based localization system may assist an unmanned vehicle to continue its operation in a GPS-denied environment with minimal increase in vehicular cost and payload. The camera-based localization system is based on the fusion of visual signal and inertial measurement unit (IMU) data. The key aspect of the system is an optical flow based fast visual inertial odometry (VIO) method. Unlike traditional VIO techniques, photo-consistency may not be needed in the camera-based localization system.

Figure 1:
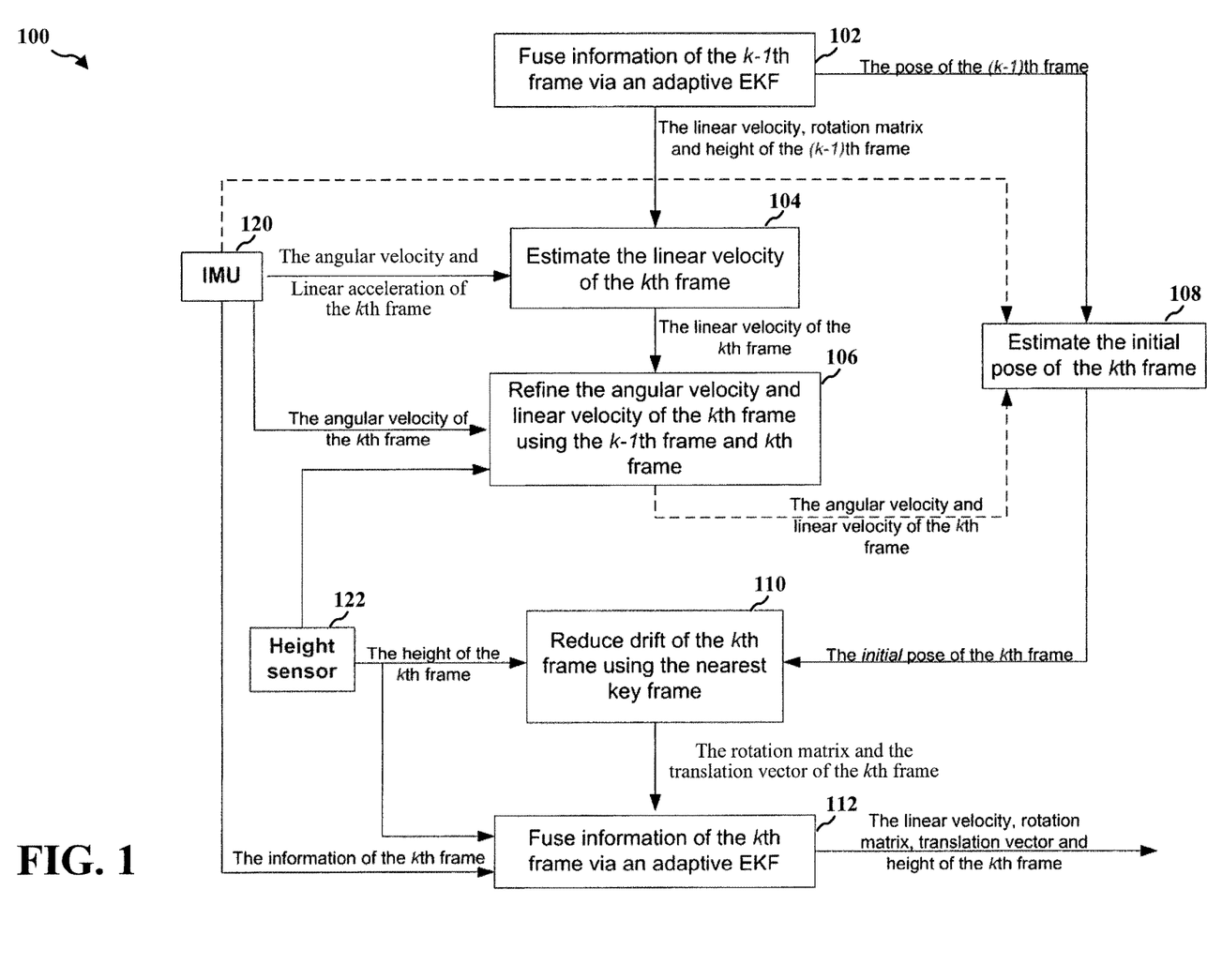
FIG. 1 is a diagram illustrating the overall framework of the camera-based localization system of some embodiments.

FIG. 1 is a diagram 100 illustrating the overall framework of the camera-based localization system of some embodiments. In some embodiments, the camera-based localization system may be part of an unmanned vehicle. In some embodiments, the camera-based localization system may be performed by an apparatus (e.g., the apparatus 402/402' described below with reference to FIG. 4 or FIG. 5).

At 102, the apparatus may fuse information of the (k−1)th frame via an adaptive extended Kalman filter (EKF). The (k−1)th frame may be a video frame captured by a camera associated with the apparatus. As a result, the apparatus may obtain the pose of the (k−1)th frame, as well as the linear velocity, rotation matrix, and height of the (k−1)th frame.

In some embodiments, the pose of an object may be a combination of position and orientation of the object. In some embodiments, the pose of an object may be the position of the object. In some embodiments, a variable (e.g., linear velocity) of a particular frame (e.g., kth frame) may denote the value of the variable regarding the apparatus at the time instance of the particular frame being captured by the camera.

At 104, the apparatus may estimate the linear velocity of the kth frame. The kth frame may be a video frame captured by the camera subsequent to the (k−1)th frame. In some embodiments, the linear velocity of the kth frame may be estimated based on the linear velocity, rotation matrix, and height of the (k−1)th frame, as well as the angular velocity and linear acceleration of the kth frame. The angular velocity and linear acceleration of the kth frame may be provided by an IMU 120.

At 106, the apparatus may refine the angular velocity and the linear velocity of the kth frame using the (k−1)th frame and the kth frame. In some embodiments, the angular velocity and linear velocity of the kth frame may be refined based on the linear velocity of the kth frame (estimated at 104), the angular velocity of the kth frame (provided by the IMU 120), and the height of the kth frame (provided by a height sensor 122).

At 108, the apparatus may estimate the initial pose of the kth frame. In some embodiments, the initial pose of the kth frame may be estimated based on the pose of the (k−1)th frame (obtained at 102), the refined angular velocity and linear velocity of the kth frame (obtained at 106), and data provided by the IMU 120.

At 110, the apparatus may reduce the drift of the kth frame using the nearest key frame. In some embodiments, the drift of the kth frame may be reduced based on the initial pose of the kth frame (obtained at 108) and the height of the kth frame (provided by the height sensor 122). As a result of the drift reduction, the apparatus may obtain the rotation matrix and the translation vector of the kth frame.

At 112, the apparatus may fuse information of the kth frame via an adaptive EKF. The information being fused may include the rotation matrix and the translation vector of the kth frame (obtained at 110), the height of the kth frame (provided by the height sensor 122), and the information of the kth frame (provided by the IMU 120). Consequently, the apparatus may obtain the linear velocity, rotation matrix, translation vector, and height of the kth frame.

In some embodiments, a discrete dynamic model is developed using matrix theory and linear control system theory. In one embodiment, the model may represent a dynamic model of the unmanned aerial vehicle (UAV). The model may be used to estimate initial values of optimized variables.

Let $V=[V_x\ V_y\ V_z]^T$ be the linear velocity in the world frame and $R=[R_1\ R_2\ R_3]$ be the rotation matrix from the world reference frame to the body frame. Their dynamics is represented as $$\begin{bmatrix} \dot{V} \\ \dot{R}_1 \\ \dot{R}_2 \\ \dot{R}_3 \end{bmatrix} = \begin{bmatrix} R^T a \\ -sk(\omega)R_1 \\ -sk(\omega)R_2 \\ -sk(\omega)R_3 \end{bmatrix} - \begin{bmatrix} g \\ 0 \\ 0 \\ 0 \end{bmatrix}, \quad (1)$$

where $a=[a_1\ a_2\ a_3]^T$ is the linear acceleration in the body frame that is measured with an accelerometer (e.g., in the IMU 120), and $g=[0\ 0\ g_w]$ with $g_w$ being the gravity acceleration in the world frame. $\omega=[\omega_x\ \omega_y\ \omega_z]^T$ is the angular velocity of the UAV that is measured by a gyroscope (e.g., in the IMU 120), and $sk(\omega)$ is defined as $$sk(\omega) = \begin{bmatrix} 0 & -\omega_z & \omega_y \\ \omega_z & 0 & -\omega_x \\ -\omega_y & \omega_x & 0 \end{bmatrix}. \quad (2)$$

Using the matrix theory, it can be derived that $$R^T a = \begin{bmatrix} R_1^T a \\ R_2^T a \\ R_3^T a \end{bmatrix} = \begin{bmatrix} a^T R_1 \\ a^T R_2 \\ a^T R_3 \end{bmatrix}. \quad (3)$$

It follows that $$\begin{bmatrix} \dot{V} \\ \dot{R}_1 \\ \dot{R}_2 \\ \dot{R}_3 \end{bmatrix} = A(a, \omega) \begin{bmatrix} V \\ R_1 \\ R_2 \\ R_3 \end{bmatrix} - \begin{bmatrix} g \\ 0 \\ 0 \\ 0 \end{bmatrix}, \quad (4)$$

where the matrix $A(a, \omega)$ is given by $$A(a, \omega) = \begin{bmatrix} 0 & \hat{A}_1(a) & \hat{A}_2(a) & \hat{A}_3(a) \\ 0 & -sk(\omega) & 0 & 0 \\ 0 & 0 & -sk(\omega) & 0 \\ 0 & 0 & 0 & -sk(\omega) \end{bmatrix}, \quad (5)$$

$$\hat{A}_1(a) = \begin{bmatrix} a_1 & a_2 & a_3 \\ 0 & 0 & 0 \\ 0 & 0 & 0 \end{bmatrix},$$

$$\hat{A}_2(a) = \begin{bmatrix} 0 & 0 & 0 \\ a_1 & a_2 & a_3 \\ 0 & 0 & 0 \end{bmatrix},$$

$$\hat{A}_3(a) = \begin{bmatrix} 0 & 0 & 0 \\ 0 & 0 & 0 \\ a_1 & a_2 & a_3 \end{bmatrix}.$$

When the values of $a$ and $\omega$ are fixed, it can easily derived that $$\exp^{A(a,\omega)} = \begin{bmatrix} I & \tilde{A}_1(a, \omega) & \tilde{A}_2(a, \omega) & \tilde{A}_3(a, \omega) \\ 0 & E(\omega) & 0 & 0 \\ 0 & 0 & E(\omega) & 0 \\ 0 & 0 & 0 & E(\omega) \end{bmatrix}, \quad (6)$$

$$\tilde{A}_1(a, \omega) = [\Gamma^T(\omega)a \; 0 \; 0]^T,$$
$$\tilde{A}_2(a, \omega) = [0 \; \Gamma^T(\omega)a \; 0]^T,$$
$$\tilde{A}_3(a, \omega) = [0 \; 0 \; \Gamma^T(\omega)a]^T,$$

where $I$ is a 3×3 identity matrix, and the matrix $E(\omega)$ is given as $$E(\omega) = I - \frac{\sin\|\omega\|}{\|\omega\|} sk(\omega) + \frac{1-\cos\|\omega\|}{\|\omega\|^2} (sk(\omega))^2 \quad (7)$$

$$\|\omega\| = \sqrt{\omega_x^2 + \omega_y^2 + \omega_z^2}$$

and the matrix $\Gamma(\omega)$ is given by $$\Gamma(\omega) = I + \frac{\cos\|\omega\| - 1}{\|\omega\|^2} sk(\omega) + \frac{\|\omega\| - \sin\|\omega\|}{\|\omega\|^3} (sk(\omega))^2. \quad (8)$$

Consider two discrete time instances $k$ and $(k+1)$ with the interval as $\Delta T$, it follows from the linear control system theory that $$\begin{bmatrix} V(k+1) \\ R_1(k+1) \\ R_2(k+1) \\ R_3(k+1) \end{bmatrix} = \exp^{A(\Delta T a, \Delta T \omega)} \begin{bmatrix} V(k) \\ R_1(k) \\ R_2(k) \\ R_3(k) \end{bmatrix} - \begin{bmatrix} \Delta T g \\ 0 \\ 0 \\ 0 \end{bmatrix}. \quad (9)$$

The dynamics of the camera center is now addressed. Let $P_c = [X_c \; Y_c \; Z_c]^T$ be the position of the camera center in the world reference frame. The dynamics of $P_c$ is modelled as $$\dot{P}_c = V. \quad (10)$$

Combining with the equation (4), it can be obtained that $$\begin{bmatrix} \dot{P}_c \\ \dot{V} \\ \dot{R}_1 \\ \dot{R}_2 \\ \dot{R}_3 \end{bmatrix} = B(1, a, \omega) \begin{bmatrix} P_c \\ V \\ R_1 \\ R_2 \\ R_3 \end{bmatrix} - \begin{bmatrix} 0 \\ g \\ 0 \\ 0 \\ 0 \end{bmatrix}, \quad (11)$$

where the matrix $B(s, a, \omega)$ is given by $$B(s, a, \omega) = \begin{bmatrix} 0 & sI & 0 & 0 & 0 \\ 0 & 0 & \hat{A}_1(a) & \hat{A}_2(a) & \hat{A}_3(a) \\ 0 & 0 & -sk(\omega) & 0 & 0 \\ 0 & 0 & 0 & -sk(\omega) & 0 \\ 0 & 0 & 0 & 0 & -sk(\omega) \end{bmatrix}. \quad (12)$$

Similarly, using the matrix theory, it can be derived that $$\exp^{B(s,a,\omega)} = \begin{bmatrix} I & sI & \tilde{B}_1(s,a,\omega) & \tilde{B}_2(s,a,\omega) & \tilde{B}_3(s,a,\omega) \\ 0 & & \exp^{A(a,\omega)} & & \end{bmatrix}, \quad (13)$$

where the matrices $\tilde{B}_i(s, a, \omega)$ $(i=1, 2, 3)$ are given as $$\tilde{B}_1(s,a,\omega) = [s\Lambda^T(\omega)a \; 0 \; 0]^T,$$

$$\tilde{B}_2(s,a,\omega) = [0 \; s\Lambda^T(\omega)a \; 0]^T,$$

$$\tilde{B}_3(s,a,\omega) = [0 \; 0 \; s\Lambda^T(\omega)a]^T, \quad (14)$$

and the matrix $\Lambda(\omega)$ is given by $$\Lambda(\omega) = I + \frac{\sin\|\omega\| - \|\omega\|}{\|\omega\|^3} sk(\omega) + \frac{\cos\|\omega\| - 1 + \frac{\|\omega\|^2}{2}}{\|\omega\|^4} (sk(\omega))^2. \quad (15)$$

Using the linear control system theory, a discrete dynamic model is provided as $$\begin{bmatrix} P_c(k+1) \\ V(k+1) \\ R_1(k+1) \\ R_2(k+1) \\ R_3(k+1) \end{bmatrix} = \exp^{B(\Delta T, \Delta Ta, \Delta t\omega)} \begin{bmatrix} P_c(k) \\ V(k) \\ R_1(k) \\ R_2(k) \\ R_3(k) \end{bmatrix} - \begin{bmatrix} \frac{\Delta T^2}{2} g \\ \Delta T g \\ 0 \\ 0 \\ 0 \end{bmatrix}. \quad (16)$$

The discrete dynamic model in the equation (16) is used to pre-integrate all the IMU data between two video frames. For simplicity, the current frame is assumed be the (m+1)th frame and the previous one is mth frame. Suppose that there are n IMU data between the two successive video frames.

Using the dynamic model in the equation (16), it can be obtained that $$R_i(k_m + 1) = E(\Delta T(k_m)\omega(k_m))R_i(k_m), \quad (17)$$

$$V_i(k_m + 1) =$$

$$V_i(k_m) + \Delta T(k_m)(a^T(k_m)\Gamma(\Delta T(k_m)\omega(m_m))R_i(k_m) - g_i),$$

$$P_{c,i}(k_m + 1) = P_{c,i}(k_m) + \Delta T(k_m)V_i(k_m) +$$

$$\Delta T^2(k_m)\left(a^T(k_m)\Lambda(\Delta T(k_m)\omega(k_m))R_i(k_m) - \frac{g_i}{2}\right),$$

where the value of $k_m$ is mn. Subsequently, it can be derived that $$R_i(k_{m+1}) = \prod_{j=0}^{n-1} E(\Delta T(k_m + j)\omega(k_m + j))R_i(k_m), \quad (18)$$

$$P_{c,i}(k_{m+1}) = P_{c,i}(k_m) - \Theta_i(k_m),$$

and the value of $\Theta_i(k_m)$ is computed using the equation (17).

Using the Lie algebra, it can be shown that there exists a $\tilde{\omega} = [\tilde{\omega}_1 \ \tilde{\omega}_2 \ \tilde{\omega}_3]^T$ such that $$E(\tilde{\omega}) = \prod_{j=0}^{n-1} E(\Delta T(k_m + j)\omega(k_m + j)). \quad (19)$$

$\tilde{P}_i(k_m) = [\tilde{X}_i(k_m) \ \tilde{Y}_i(k_m) \ \tilde{Z}_i(k_m)]^T$ is the coordinate of the corresponding pixel in the mth body frame. $[X_i(k_m) \ Y_i(k_m) \ Z_i(k_m)]^T$ is the coordinate of the pixel in the world reference frame. Their relationship is represented by $$\begin{bmatrix} \tilde{X}_i(k_m) \\ \tilde{Y}_i(k_m) \\ \tilde{Z}_i(k_m) \end{bmatrix} = R(k_m)\left(\begin{bmatrix} X_i(k_m) \\ Y_i(k_m) \\ Z_i(k_m) \end{bmatrix} - \begin{bmatrix} X_c(k_m) \\ Y_c(k_m) \\ Z_c(k_m) \end{bmatrix}\right). \quad (20)$$

It follows that $$\begin{bmatrix} \tilde{X}_i(k_{m+1}) \\ \tilde{Y}_i(k_{m+1}) \\ \tilde{Z}_i(k_{m+1}) \end{bmatrix} = E(\tilde{\omega}) \begin{bmatrix} \tilde{X}_i(k_m) \\ \tilde{Y}_i(k_m) \\ \tilde{Z}_i(k_m) \end{bmatrix} - E(\tilde{\omega})\tilde{\Theta}, \quad (21)$$

where the value of $\tilde{\Theta}$ is computed as $$\tilde{\Theta} = R(k_m)\Theta(k_m) \quad (22)$$

It is shown in the equation (21) that the rigid-body transformation matrix is determined by $\tilde{\omega}$ and $\tilde{\Theta}$. In some embodiments, $\tilde{\omega}$ and $\tilde{\Theta}$ may be the angular velocity and linear velocity, respectively. $\tilde{\omega}$ and $\tilde{\Theta}$ will be the optimized variable in a nonlinear optimization problem described below. A nonlinear optimization problem may be converted into a quadratic optimization problem if the initial values of the optimized variables are available. The initial values of $\tilde{\omega}$ and $\tilde{\Theta}$ are given in the equations (19) and (22), respectively. Thus, the motion pre-integration via the IMU data may be used to determine the initial values of $\tilde{\omega}$ and $\tilde{\Theta}$. In some embodiments, the initial values of $\tilde{\omega}$ and $\tilde{\Theta}$ may be determined at 104.

Refinement of $\tilde{\omega}$ and $\tilde{\Theta}$ may then be performed, using optical flow of two successive frames. The refinement may be divided into two steps. In the first step, optical flow of each feature point is estimated using for example, a conventional scale-invariant feature transform (SIFT) based method. In the second step, the values of $\tilde{\omega}$ and $\tilde{\Theta}$ of the current frame may be refined via solving an optimization problem which is built up based on the optical flow of all the feature points.

Let $p_i = [u_i, v_i]^T$ be the ith feature point in the mth frame and the relationship between $p_i$ and $\tilde{P}_i(k_m)$ is represented as $$\begin{bmatrix} u_i \\ v_i \end{bmatrix} = \pi(\tilde{P}_i(k_m)) = \begin{bmatrix} f_x \frac{\tilde{X}_i(k_m)}{\tilde{Z}_i(k_m)} + c_x \\ f_y \frac{\tilde{Y}_i(k_m)}{\tilde{Z}_i(k_m)} + c_y \end{bmatrix}, \quad (23)$$

where $f_x$ and $f_y$ are the focal lengths of the camera in pixels, and $c_x$ and $c_y$ are the coordinates of the principle point in pixels. If the value of $\tilde{Z}_i(k_m)$ is available, the coordinate $\tilde{P}_i(k_m)$ is given as $$\tilde{P}_i(k_m) = \pi^{-1}(p_i, \tilde{Z}_i(k_m)) = \begin{bmatrix} \frac{u_i - c_x}{f_x} \tilde{Z}_i(k_m) & \frac{v_i - c_y}{f_y} \tilde{Z}_i(k_m) & \tilde{Z}_i(k_m) \end{bmatrix}^T. \quad (24)$$

Let $[\hat{X}_i(k_m)\ \hat{Y}_i(k_m)\ \hat{Z}_i(k_m)]^T$ be defined as $$\begin{bmatrix} \hat{X}_i(k_m) \\ \hat{Y}_i(k_m) \\ \hat{Z}_i(k_m) \end{bmatrix} = \begin{bmatrix} X_i(k_m) \\ Y_i(k_m) \\ Z_i(k_m) \end{bmatrix} - \begin{bmatrix} X_c(k_m) \\ Y_c(k_m) \\ Z_c(k_m) \end{bmatrix}. \quad (25)$$

It can be derived that $$\begin{bmatrix} \hat{X}_i(k_m) \\ \hat{Y}_i(k_m) \\ \hat{Z}_i(k_m) \end{bmatrix} = \begin{bmatrix} R_{11}(k_m) & R_{21}(k_m) & R_{31}(k_m) \\ R_{12}(k_m) & R_{22}(k_m) & R_{32}(k_m) \\ R_{13}(k_m) & R_{23}(k_m) & R_{33}(k_m) \end{bmatrix} \begin{bmatrix} \frac{u_i - c_x}{f_x} \tilde{Z}_i(k_m) \\ \frac{v_i - c_y}{f_y} \tilde{Z}_i(k_m) \\ \tilde{Z}_i(k_m) \end{bmatrix}. \quad (26)$$

From the third row of the equation (26), the value of $\tilde{Z}_i(k_m)$ is computed as $$\tilde{Z}_i(k_m) = \frac{\hat{Z}_i(k_m)}{R_{13}(k_m)\frac{u_i - c_x}{f_x} + R_{23}(k_m)\frac{v_i - c_y}{f_y} + R_{33}(k_m)}, \quad (27)$$

where the value of $\tilde{Z}_i(k_m)$ is equal to the height of the UAV, and its value can be obtained from the sensor fusion output of the previous frame. Thus, it is assumed to be available. The coordinate $\tilde{P}_i(k-1)$ may then be computed as in the equation (24).

Let the accurate optical flow at the pixel $(u_i, v_i)$ be $(du_i^*, dv_i^*)$. It is assumed that the values of $(du_i^*, dv_i^*)$ are obtained via a traditional robust method. It should be pointed out that the traditional method may be refined by using the initial values of $\tilde{\omega}$ and $\tilde{\Theta}$. For example, a multi-scale algorithm may be simplified as a single-scale one. A new optical flow based matching error between two images $I_m$ and $I_{m+1}$ at the pixel $(u_i, v_i)$ of the image $I_m$ is introduced as $$\delta I_i(\tilde{\omega}, \tilde{\Theta}) = (du_i - du_i^*)^2 + (dv_i - dv_i^*)^2, \quad (28)$$

where $du_i$ and $dv_i$ are computed as $$du_i = f_x \frac{E_1 \tilde{P}_i(k_m) - E_1 \tilde{\Theta}}{E_3 \tilde{P}_i(k_m) - E_3 \tilde{\Theta}} + c_x - u_i; \quad (29)$$

$$dv_i = f_y \frac{E_2 \tilde{P}_i(k_m) - E_2 \tilde{\Theta}}{E_3 \tilde{P}_i(k_m) - E_3 \tilde{\Theta}} + c_y - v_i$$

and $E = [E_1^T\ E_2^T\ E_3^T]^T$.

The optimal values of $\tilde{\omega}$ and $\tilde{\Theta}$ may be obtained by solving the following optimization problem:

$$\operatorname*{argmin}_{\tilde{\omega}, \tilde{\Theta}} \left\{ \sum_i \delta I_i(\tilde{\omega}, \tilde{\Theta}) \right\}. \quad (30)$$

It can be shown from the equations (28)-(30) that the cost function in some embodiments is different from the intensity based cost function in traditional approaches. With the cost function of such embodiments, the estimation of optical flow $(du_i^*, dv_i^*)$ and the estimation of $(\tilde{\omega}, \tilde{\Theta})$ are separated into two independent steps by the algorithm of such embodiments rather than combining together as in the traditional approaches. The robustness of the algorithm of such embodiments is improved in this way because the optical flow $(du_i^*, dv_i^*)$ can be obtained via a traditional robust method. This may be needed for out-door UAV system, especially in presence of lighting condition changes, moving subjects, and noise in the out-door environment.

Using the following Taylor expansion $$du_i = du_i^{(0)} + \gamma_1^T(u_i, v_i)(\tilde{\omega} - \tilde{\omega}^{(0)}) + \gamma_2^T(u_i, v_i)(\tilde{\Theta} - \tilde{\Theta}^{(0)}) \quad (31)$$

$$du_i^{(0)} = f_x \frac{E_1^{(0)} \tilde{P}_i(k_m) - E_1^{(0)} \tilde{\Theta}^{(0)}}{E_3^{(0)} \tilde{P}_i(k_m) - E_3^{(0)} \tilde{\Theta}^{(0)}} + c_x - u_i$$

$$\gamma_1(u_i, v_i) = \frac{\partial du_i}{\partial \tilde{\omega}} \Big|_{\tilde{\omega} = \tilde{\omega}^{(0)}, \tilde{\Theta} = \tilde{\Theta}^{(0)}}$$

$$\gamma_2(u_i, v_i) = \frac{\partial du_i}{\partial \tilde{\Theta}} \Big|_{\tilde{\omega} = \tilde{\omega}^{(0)}, \tilde{\Theta} = \tilde{\Theta}^{(0)}},$$

$$dv_i = dv_i^{(0)} + \gamma_3^T(u_i, v_i)(\tilde{\omega} - \tilde{\omega}^{(0)}) + \gamma_4^T(u_i, v_i)(\tilde{\Theta} - \tilde{\Theta}^{(0)})$$

$$dv_i^{(0)} = f_y \frac{E_2^{(0)} \tilde{P}_i(k_m) - E_2^{(0)} \tilde{\Theta}^{(0)}}{E_3^{(0)} \tilde{P}_i(k_m) - E_3^{(0)} \tilde{\Theta}^{(0)}} + c_y - v_i$$

$$\gamma_3(u_i, v_i) = \frac{\partial dv_i}{\partial \tilde{\omega}} \Big|_{\tilde{\omega} = \tilde{\omega}^{(0)}, \tilde{\Theta} = \tilde{\Theta}^{(0)}}$$

$$\gamma_4(u_i, v_i) = \frac{\partial dv_i}{\partial \tilde{\Theta}\omega} \Big|_{\tilde{\omega} = \tilde{\omega}^{(0)}, \tilde{\Theta} = \tilde{\Theta}^{(0)}}$$

where the matching error in the equation (28) may be approximated as $$\delta I_i(\tilde{\omega}, \tilde{\Theta}) = (du_i^{(0)} + \gamma_1^T(u_i, v_i)(\tilde{\omega} - \tilde{\omega}^{(0)}) + \gamma_2^T(u_i, v_j)(\tilde{\omega} - \tilde{\omega}^{(0)}) - du_i^*)^2 + (dv_i^{(0)} + \gamma_3^T(u_i, v_i)(\tilde{\omega} - \tilde{\omega}^{(0)}) + \gamma_4^T(u_i, v_i)(\tilde{\omega} - \tilde{\omega}^{(0)}) - dv_i^*)^2 \quad (32)$$

The optimal values of $\tilde{\omega}$ and $\tilde{\Theta}$ are then computed as $$\begin{bmatrix} \tilde{\omega}^* \\ \tilde{\Theta}^* \end{bmatrix} = \begin{bmatrix} \tilde{\omega}^{(0)} \\ \tilde{\Theta}^{(0)} \end{bmatrix} - M^{-1}\varepsilon, \quad (33)$$

where the matrix $M$ and the vector $\varepsilon$ are defined as $$M = \sum_i \left( \begin{bmatrix} \gamma_1(u_i, v_i) \\ \gamma_2(u_i, v_i) \end{bmatrix} [\gamma_1^T(u_i, v_i)\ \gamma_2^T(u_i, v_i)] + \begin{bmatrix} \gamma_3(u_i, v_i) \\ \gamma_4(u_i, v_i) \end{bmatrix} [\gamma_3^T(u_i, v_i)\ \gamma_4^T(u_i, v_i)] \right) \quad (34)$$

$$\varepsilon = \sum_i \left( (du_i^{(0)} - du_i^*) \begin{bmatrix} \gamma_1(u_i, v_i) \\ \gamma_2(u_i, v_i) \end{bmatrix} + (dv_i^{(0)} - dv_i^*) \begin{bmatrix} \gamma_3(u_i, v_i) \\ \gamma_4(u_i, v_i) \end{bmatrix} \right).$$

The optimal solution can also be obtained iteratively as follows:

$$\begin{bmatrix} \tilde{\omega}^{(j),*} \\ \tilde{\Theta}^{(j),*} \end{bmatrix} = \begin{bmatrix} \tilde{\omega}^{(j-1),*} \\ \tilde{\Theta}^{(j-1),*} \end{bmatrix} - M^{-1}\varepsilon_{j-1}, \quad (35)$$

where the vector $\varepsilon_j$ is defined as $$\varepsilon_{j-1} = \sum_i (du_i^{(j-1),*} - du_i^*)\begin{bmatrix} \gamma_1(u_i, v_i) \\ \gamma_2(u_i, v_i) \end{bmatrix} + (dv_i^{(j-1),*} - dv_i^*)\begin{bmatrix} \gamma_3(u_i, v_i) \\ \gamma_4(u_i, v_i) \end{bmatrix} \quad (36)$$

$$\gamma_1(u_i, v_i) = \frac{\partial du_i}{\partial \tilde{\omega}}\bigg|_{\tilde{\omega}=\tilde{\omega}^{(j-1),*}, \tilde{\Theta}=\tilde{\Theta}^{(j-1),*}}$$

$$\gamma_2(u_i, v_i) = \frac{\partial du_i}{\partial \tilde{\Theta}}\bigg|_{\tilde{\omega}=\tilde{\omega}^{(j-1),*}, \tilde{\Theta}=\tilde{\Theta}^{(j-1),*}}$$

$$\gamma_3(u_i, v_i) = \frac{\partial dv_i}{\partial \tilde{\omega}}\bigg|_{\tilde{\omega}=\tilde{\omega}^{(j-1),*}, \tilde{\Theta}=\tilde{\Theta}^{(j-1),*}}$$

$$\gamma_4(u_i, v_i) = \frac{\partial du_i}{\partial \tilde{\Theta}}\bigg|_{\tilde{\omega}=\tilde{\omega}^{(j-1),*}, \tilde{\Theta}=\tilde{\Theta}^{(j-1),*}}$$

With the above derivation, the values of $\tilde{\omega}$ and $\tilde{\Theta}$ of the (m+1)th frame may be refined in detail as follows:

Step 1. Initialization.

$$\tilde{\omega}^{(0),*} = \tilde{\omega}^{(0)}$$

$$\tilde{\Theta}^{(0),*} = \tilde{\Theta}^{(0)}.$$

$$j=1 \quad (37)$$

Step 2. Iteration. Update $$du_i^{(j)} = f_x \frac{E_1^{(j),*} \tilde{P}_i(k_m) - E_1^{(j),*} \tilde{\Theta}^{(j),*}}{E_3^{(j),*} \tilde{P}_i(k_m) - E_3^{(j),*} \tilde{\Theta}^{(j),*}} + c_x - u_i \quad (38)$$

$$dv_i^{(j)} = f_y \frac{E_2^{(j),*} \tilde{P}_i(k_m) - E_2^{(j),*} \tilde{\Theta}^{(j),*}}{E_3^{(j),*} \tilde{P}_i(k_m) - E_3^{(j),*} \tilde{\Theta}^{(j),*}} + c_y - v_i,$$

and compute the values of $\tilde{\omega}^{(j+1),*}$ and $\tilde{\Theta}^{(j+1),*}$ via the equations (35) and (36), and increase the value of j by 1. In some embodiments, the angular velocity and linear velocity of the (m+1)th frame may be refined/optimized at 106.

The estimated pose tends to drift away from the real position of the apparatus over time as small errors accumulate. To reduce drift for the current frame through the nearest key frame (as described above with reference to 110), a method of some embodiments corrects the values of $\tilde{\omega}$ and $\tilde{\Theta}$ of the (m+1)th frame through using the key frame. The objective for correcting the angular velocity and linear velocity of the kth frame is to reduce drifts in the rotation matrix and translation vector of the kth frame. It should be pointed out that the corrected values may not be accurate. Fortunately, the corrected angular velocity and linear velocity are only used to compute the rotation matrix and translation vector of the kth frame.

The initial values of the rotation matrix $R(k_{m+1})$ and the translation vector $T(k_{m+1})$ can be computed as $$R^{(0)}(k_{m+1}) = E * R(k_m)$$

$$T^{(0)}(k_{m+1}) = -E * \tilde{\Theta}*. \quad (39)$$

The nearest key frame may be defined as a key frame that shares the largest possible captured region with the current (m+1)th frame. To reduce the computation cost, $\kappa$ key frames with the smallest center distance may be selected. The center distance may be defined as $$d_c(k_{m+1}, r) = (X_c(k_{m+1}) - X_c(r))^2 + (Y_c(k_{m+1}) - Y_c(r))^2 + (Z_c(k_{m+1}) - Z_c(r))^2, \quad (40)$$

where the coordinate of the current camera center in the world reference frame is computed as $$-R^{(0),T}(k_{m+i})T^{(0)}(k_{m+1}).$$

Among the selected $\kappa$ key frames, the frame with the observation angle that is the most similar to that of the kth frame is chosen as the nearest key frame. After selecting the nearest reference/key frame, good feature points in the common captured region between the kth frame and the nearest reference frame are used to refine the pose of the kth frame. All the good common feature points may be detected as described below.

The coordinate of the top left pixel $m_{i_0} = [0\ 0]^T$ of the kth image in the world reference frame is computed as $$\tilde{P}_{i_0}(k_{m+1}) = \left[ -\frac{c_x}{f_x} \tilde{Z}_{i_0}(k_{m+1}) \quad -\frac{c_y}{f_y} \tilde{Z}_{i_0}(k_{m+1}) \quad \tilde{Z}_{i_0}(k_{m+1}) \right]^T \quad (41)$$

$$P_{i_0}(k_{m+1}) = R^{(0),T}(k_{m+1})(\tilde{P}_{i_0}(k_{m+1}) - T^{(0)}(k_{m+1})).$$

Similarly, the coordinates of the top right pixel $m_{i_1} = [0\ H]^T$, the bottom left pixel $m_{i_2} = [W\ 0]^T$, and the bottom right pixel $m_{i_3} = [W\ H]^T$ are computed.

The visible region of the (m+1)th frame may be determined by the coordinates of the four pixels $m_{i_0}, m_{i_1}, m_{i_2}, m_{i_3}$. A good feature point in the key frame is a common one if its coordinate in the world reference frame is in the visible region of the kth frame. Once all the good common feature points are available, the pose of the (m+1)th frame is refined.

For the matching of the ith feature point, an initial value may be computed as follows:

$$\begin{bmatrix} \tilde{X}_i \\ \tilde{Y}_i \\ \tilde{Z}_i \end{bmatrix} = R^{(0)}(k_{m+1}) \begin{bmatrix} X_i - X_c(k_{m+1}) \\ Y_i - Y_c(k_{m+1}) \\ Z_i - Z_c(k_{m+1}) \end{bmatrix} \quad (42)$$

$$u_i^0 = f_x \frac{\tilde{X}_i}{\tilde{Z}_i} + c_u$$

$$v_i^0 = f_y \frac{\tilde{Y}_i}{\tilde{Z}_i} + c_v,$$

where the value of $[X_i, Y_i, Z_i]^T$ is computed by using the pixel $[u_i\ v_i]^T$ as well as the pose and height of the nearest key frame. It can also be stored for the pixel $[u_i\ v_i]^T$. The searching range is reduced by using the initial values of $[u_i^0\ v_i^0]^T$.

The optimization problem is formulated as $$\begin{bmatrix} u_i'^{,*} \\ v_i'^{,*} \end{bmatrix} = \underset{[u_i'\ v_i'] \in \Omega([u_i^0\ v_i^0])}{\operatorname{argmin}} \left\{ \frac{1}{2} \sum_{h,w} \|I_k(u_i' + w, v_i' + h) - I_r(u_i + w, v_i + h)\|^2 \right\}, \forall i. \quad (43)$$

Let the warping matrix be denoted as $$\tilde{\omega}(p) = \begin{bmatrix} 1 + p_1 & p_2 & p_3 \\ p_4 & 1 + p_5 & p_6 \end{bmatrix}. \quad (44)$$

The initial value of the warping matrix may be obtained by solving the following optimization problem:

$$\arg\min_{\tilde{\omega}(p)} \left\{ \frac{1}{2} \sum_i \left\| \tilde{\omega}(p) \begin{bmatrix} u_i^0 \\ v_i^0 \\ 1 \end{bmatrix} - \begin{bmatrix} u_i \\ v_i \end{bmatrix} \right\|^2 \right\}. \tag{45}$$

The optimal value is given as $$\begin{bmatrix} p_1^0 \\ p_2^0 \\ p_3^0 \end{bmatrix} = \left( \sum_i \begin{bmatrix} u_i^0 \\ v_i^0 \\ 1 \end{bmatrix} [u_i^0 \ v_i^0 \ 1] \right)^{-1} \sum_i (u_i - u_i^0) \begin{bmatrix} u_i^0 \\ v_i^0 \\ 1 \end{bmatrix} \tag{46}$$

$$\begin{bmatrix} p_4^0 \\ p_5^0 \\ p_6^0 \end{bmatrix} = \left( \sum_i \begin{bmatrix} u_i^0 \\ v_i^0 \\ 1 \end{bmatrix} [u_i^0 \ v_i^0 \ 1] \right)^{-1} \sum_i (v_i - v_i^0) \begin{bmatrix} u_i^0 \\ v_i^0 \\ 1 \end{bmatrix}.$$

The optimization problem in the equation (43) may be solved by using the inverse compositional Lucas-Kanade algorithm. The optimal values are given as $$u_i'^* = \frac{(1 + p_5^*)(u_i - p_3^*) - p_2^*(v_i - p_6^*)}{(1 + p_1^*)(1 + p_5^*) - p_2^* p_4^*} \tag{47}$$

$$v_i'^* = \frac{(1 + p_1^*)(v_i - p_6^*) - p_4^*(u_i - p_3^*)}{(1 + p_1^*)(1 + p_5^*) - p_2^* p_4^*}.$$

The feature correspondence that is established in the equation (43) could violate the epipolar constraint. The values of angular velocity and linear acceleration are corrected for the current frame by using the epipolar constraint, i.e., solving the following optimization problem:

$$[\tilde{\omega}^* \ \tilde{\Theta}^*]^T = \arg\min_{\tilde{\omega}, \tilde{\Theta}} \left\{ \frac{1}{2} \sum_i \left\| \begin{bmatrix} \frac{u_i'^* - c_x}{f_x} \tilde{Z}_i(k_{m+1}) - \tilde{X}_i(k_{m+1}) \\ \frac{v_i'^* - c_y}{f_y} \tilde{Z}_i(k_{m+1}) - \tilde{Y}_i(k_{m+1}) \end{bmatrix} \right\|^2 \right\} \tag{48}$$

$$\begin{bmatrix} \tilde{X}_i(k_{m+1}) \\ \tilde{Y}_i(k_{m+1}) \\ \tilde{Z}_i(k_{m+1}) \end{bmatrix} = \begin{bmatrix} E_1 \tilde{P}_i(k_m) - E_1 \tilde{\Theta} \\ E_2 \tilde{P}_i(k_m) - E_2 \tilde{\Theta} \\ E_3 \tilde{P}_i(k_m) - E_3 \tilde{\Theta} \end{bmatrix}.$$

Similar to the optimization problem in the equation (30), the above optimization problem may be solved using the first-order Taylor expansion. The pose of the (m+1)th frame may be refined as $$R^*(k_{m+1}) = E^* R(k_m)$$

$$T^*(k_{m+1}) = -E^* \tilde{\Theta}^*. \tag{49}$$

In some embodiments, the drift of the current frame may be corrected at 110.

Employing an inertial measurement unit as an additional sensor may dramatically improve both reliability and accuracy of traditional localization solutions. In another embodiment, a further model is developed for autonomous ground vehicles (AGVs). Motion pre-integration is then provided for the AGV using the model and the IMU data. The pre-integration may be used to determine initial values of optimized variables. Subsequently, a nonlinear optimization problem may be converted into a quadratic optimization problem. It is much easier to solve a quadratic optimization problem than a nonlinear one. Thus, the motion pre-integration of such embodiment is very helpful for the AGVs.

A wheeled AGV is supposed to take a planar motion. In this example, a further discrete dynamic model is derived for the AGV, once again, using the linear algebra and the linear control system theory.

Let $V = [V_1 \ V_2]^T$ be the linear velocity in the world frame and $R = [R_1 \ R_2]$ be the rotation matrix from the world frame to the body frame. Their dynamics is represented as $$\begin{bmatrix} \dot{V} \\ \dot{R}_1 \\ \dot{R}_2 \end{bmatrix} = \begin{bmatrix} R^T a \\ -sk(\omega) R_1 \\ -sk(\omega) R_2 \end{bmatrix}, \tag{50}$$

where $a = [a_1 \ a_2]^T$ is the linear acceleration in the body frame that is measured with an accelerometer (e.g., in the IMU 120). $\omega$ is the angular velocity of the AGV that is measured by a gyroscope (e.g., in the IMU 120), and the matrix $sk(\omega)$ is defined as $$sk(\omega) = \begin{bmatrix} 0 & -\omega \\ \omega & 0 \end{bmatrix}. \tag{51}$$

Using the matrix theory, it can be derived that $$R^T a = \begin{bmatrix} R_1^T a \\ R_2^T a \end{bmatrix} = \begin{bmatrix} a^T R_1 \\ a^T R_2 \end{bmatrix} \tag{52}$$

If follows that $$\begin{bmatrix} \dot{V} \\ \dot{R}_1 \\ \dot{R}_2 \end{bmatrix} = A(a, \omega) \begin{bmatrix} V \\ R_1 \\ R_2 \end{bmatrix}, \tag{53}$$

where the matrix $A(a, \omega)$ is given by $$A(a, \omega) = \begin{bmatrix} 0 & \hat{A}_1(a) & \hat{A}_2(a) \\ 0 & -sk(\omega) & 0 \\ 0 & 0 & -sk(\omega) \end{bmatrix}, \tag{54}$$

$$\hat{A}_1(a) = \begin{bmatrix} a_1 & a_2 \\ 0 & 0 \end{bmatrix},$$

$$\hat{A}_2(a) = \begin{bmatrix} 0 & 0 \\ a_1 & a_2 \end{bmatrix}.$$

When the values of a and ω are fixed, it can be easily derived that $$\exp^{A(a,\omega)} = \begin{bmatrix} I & \tilde{A}_1(a) & \tilde{A}_2(a,\omega) \\ 0 & E(\omega) & 0 \\ 0 & 0 & E(\omega) \end{bmatrix} \quad (55)$$

$$\tilde{A}_1(a,\omega) = [\Gamma^T(\omega)a\ 0]^T,$$

$$\tilde{A}_2(a,\omega) = [0\ \Gamma^T(\omega)a]^T,$$

where I is a 2×2 identity matrix, the matrix E(ω) is given as $$E(\omega) = I - \frac{\sin\omega}{\omega}sk(\omega) + \frac{1-\cos\omega}{\omega^2}(sk(\omega))^2, \quad (56)$$

and the matrix Γ(ω) is given as $$\Gamma(\omega) = I + \frac{\cos\omega - 1}{\omega^2}sk(\omega) + \frac{\omega - \sin\omega}{\omega^3}(sk(\omega))^2. \quad (57)$$

Considering two discrete time instance k and k+1 with the interval as ΔT, it follows from the linear control system theory that $$\begin{bmatrix} V(k+1) \\ R_1(k+1) \\ R_2(k+1) \end{bmatrix} = \exp^{A(\tilde{a},\tilde{\omega})} \begin{bmatrix} V(k) \\ R_1(k) \\ R_2(k) \end{bmatrix}, \quad (58)$$

where ã and ω̃ are ΔTa and ΔTω, respectively.

The dynamics of the AGV position is now addressed. Let $P_c = [X_c\ Y_c]$ be the position. The dynamics of $P_c$ is modelled as $$\dot{P}_c = V. \quad (59)$$

Combining with the equation (4), it can be obtained that $$\begin{bmatrix} \dot{P}_c \\ \dot{V} \\ \dot{R}_1 \\ \dot{R}_2 \end{bmatrix} = B(1,a,\omega) \begin{bmatrix} P_c \\ V \\ R_1 \\ R_2 \end{bmatrix}, \quad (60)$$

where the matrix B(s, a, ω) is given by $$B(s,a,\omega) = \begin{bmatrix} 0 & sI & 0 & 0 \\ 0 & 0 & \hat{A}_1(a) & \hat{A}_2(a) \\ 0 & 0 & -sk(\omega) & 0 \\ 0 & 0 & 0 & -sk(\omega) \end{bmatrix} \quad (61)$$

The model of some embodiments is now compared with a traditional model. Let θ(t) be the orientation of the AGV with respect to the world frame. The pose of the AGV (e.g., a mobile robot) is represented by the vector $[X_c(t)\ Y_c(t)\ \theta(t)]^T$ and the kinematics of the AGV are given as $$\begin{bmatrix} \dot{X}_c(t) \\ \dot{Y}_c(t) \\ \dot{\theta}(t) \end{bmatrix} = \begin{bmatrix} \cos(\theta) & 0 \\ \sin(\theta) & 0 \\ 0 & 1 \end{bmatrix} \begin{bmatrix} v(t) \\ \omega(t) \end{bmatrix}, \quad (62)$$

where v(t) and ω(t) are linear and angular velocities of the AGV, respectively. They are the control input of the system. The model in the equation (13) is a nonlinear system while the model in the equation (11) is a linear system.

Similarly, using the matrix theory, it can be derived that $$\exp^{B(s,a,\omega)} = \begin{bmatrix} I & sI & \tilde{B}_1(s,a,\omega) & \tilde{B}_2(s,a,\omega) \\ 0 & & \exp^{A(a,\omega)} & \end{bmatrix}, \quad (63)$$

where the matrices $\tilde{B}_i(s,a,\omega)(i=1,2)$ are computed as $$\tilde{B}_1(s,a,\omega) = [s\Lambda^T(\omega)a\ 0]^T,$$

$$\tilde{B}_2(s,a,\omega) = [0s\Lambda^T(\omega)a]^T, \quad (64)$$

and the matrix Λ(ω) is given as $$\Lambda(\omega) = \frac{I}{2} + \frac{\sin\omega - \omega}{\omega^3}sk(\omega) + \frac{\cos\omega - 1 + \frac{\omega^2}{2}}{\omega^4}(sk(\omega))^2. \quad (65)$$

Using the linear control theory, a new discrete model is provided as $$\begin{bmatrix} P_c(k+1) \\ V(k+1) \\ R_1(k+1) \\ R_2(k+1) \end{bmatrix} = \exp^{B(\Delta T,\tilde{a},\tilde{\omega})} \begin{bmatrix} P_c(k) \\ V(k) \\ R_1(k) \\ R_2(k) \end{bmatrix}. \quad (66)$$

Traditional motion pre-integration methods are based on approximation and they focused on unmanned aerial vehicles (UAVs). In this example, the model in the equation (66) may be used to pre-integrate all available data between two time instances. Without loss of generality, it is assumed that the interval length is nΔT and the values of a and ω are only fixed in the interval with the length ΔT.

Using the dynamic model in the equation (66), it can be derived that $$R_i(k_m+1) = E(\tilde{\omega}(k_m))R_i(k_m),$$

$$V_i(k_m+1) = V_i(k_m) + \tilde{a}^T(k_m)\Gamma(\tilde{\omega}(k_m))R_i(k_m),$$

$$P_{c,i}(k_m+1) = P_{c,i}(k_m) + \tilde{V}_i(k_m) + \Delta T\tilde{a}(k_m)\Lambda(\tilde{\omega}(k_m))R_i(k_m), \quad (67)$$

where $k_m$, is mn, $\tilde{V}_i(k_m)$ is $\Delta TV_i(k_m)$.

Subsequently, it can be derived that $$R_i(k_{m+1}) = \prod_{j=0}^{n-1} E(\tilde{\omega}(k_m+j))R_i(k_m), \quad (68)$$

$$P_{c,j}(k_{m+1}) = P_{c,i}(k_m) + \Theta_i(k_m),$$

where $\Theta_i(k_m)$ is computed using the equation (18).

Using the Lie algebra, it can be shown that there exists an $\hat{\omega}$ such that $$E(\hat{\omega}) = \prod_{j=0}^{n-1} E(\tilde{\omega}(k_m + j)). \qquad (69)$$

The motion pre-integration of some embodiments described above is useful for both path planning and localization. For example, the motion pre-integration of such embodiments may be used to compute initial values of optimized values in the localization. It is shown that a nonlinear optimization problem may be converted into a quadratic optimization problem if there exists a way to compute the initial values of optimized variables. It is easier to solve a quadratic optimization problem than a nonlinear optimization problem. Therefore, the motion pre-integration of some embodiments is useful for localization.

Figure 2:
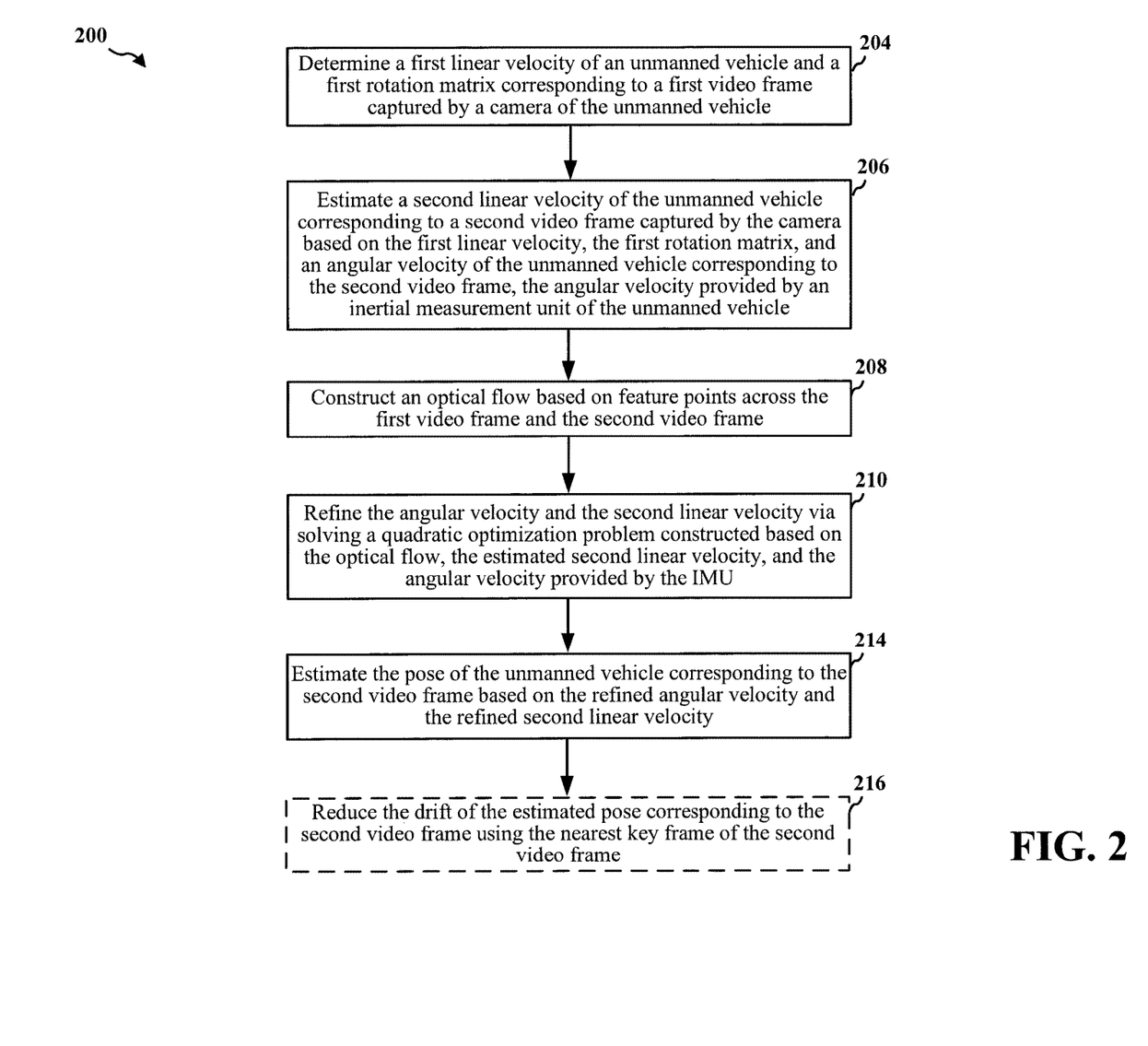
FIG. 2 is a flowchart of a method of localization via visual inertial odometry.

FIG. 2 is a flowchart 200 of a method of localization via visual inertial odometry. In some embodiments, operations of the method may include the operations described above with reference to FIG. 1. In some embodiments, the method may be performed by an apparatus (e.g., the apparatus 402/402' shown in FIG. 4 or FIG. 5).

At 204, the apparatus may determine a first linear velocity of the apparatus and a first rotation matrix corresponding to a first video frame captured by a camera of the apparatus. In some embodiments, the operations performed at 204 may include the operations described above with reference to 102 in FIG. 1.

At 206, the apparatus may estimate a second linear velocity of the apparatus corresponding to a second video frame captured by the camera based on the first linear velocity, the first rotation matrix, and an angular velocity of the apparatus corresponding to the second video frame. The angular velocity may be provided by an inertial measurement unit of the apparatus. In some embodiments, the operations performed at 206 may include the operations described above with reference to 104 in FIG. 1.

At 208, the apparatus may construct an optical flow based on feature points across the first video frame and the second video frame.

At 210, the apparatus may refine the angular velocity and the second linear velocity via solving a quadratic optimization problem constructed based on the optical flow, the estimated second linear velocity, and the angular velocity provided by the IMU. In some embodiments, the quadratic optimization problem is converted from a non-linear optimization problem because the initial value of the optimized variables is known (i.e., the angular velocity provided by the IMU, the estimated second linear velocity). In some embodiments, the operations performed at 208 and 210 may include the operations described above with reference to 106 in FIG. 1.

At 214, the apparatus may estimate the pose of the apparatus corresponding to the second video frame based on the refined angular velocity and the refined second linear velocity. In some embodiments, the operations performed at 214 may include the operations described above with reference to 108 in FIG. 1.

At 216, the apparatus may optionally reduce the drift of the estimated pose corresponding to the second video frame using the nearest key frame of the second video frame. In some embodiments, the nearest key frame of the second video frame may be a key frame that shares the largest captured region with the second video frame. In some embodiments, the drift of the estimated pose corresponding to the second video frame may be reduced using the height of the apparatus corresponding to the second video frame. In some embodiments, the operations performed at 216 may include the operations described below with reference to FIG. 3. In some embodiments, the operations performed at 216 may include the operations described above with reference to 110 in FIG. 1.

Figure 3:
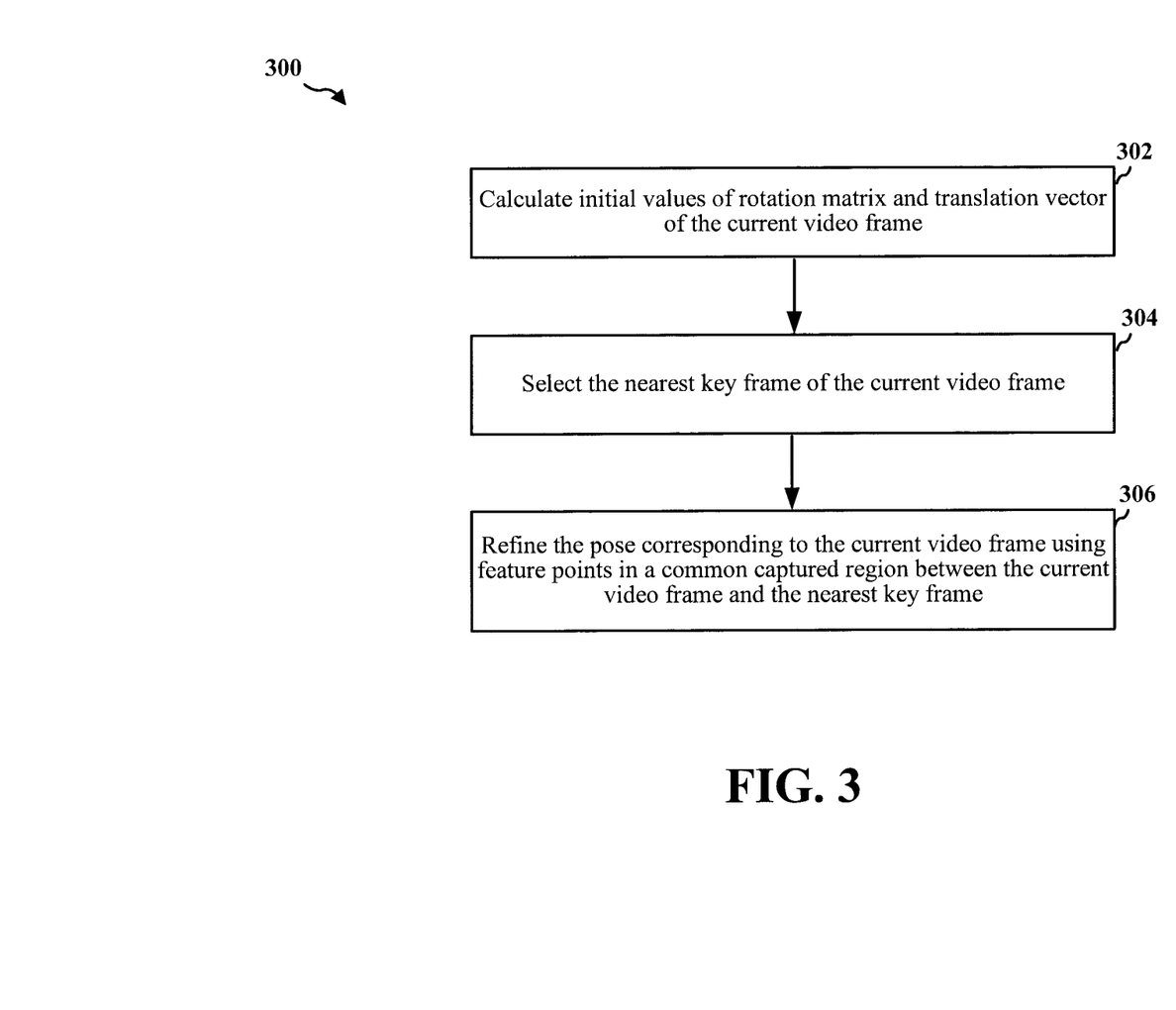
FIG. 3 is a flowchart of a method of reducing the drift of an estimated pose corresponding to a current video frame.

FIG. 3 is a flowchart 300 of a method of reducing the drift of an estimated pose corresponding to a current video frame. In some embodiments, operations of the method may include the operations described above with reference to 216 in FIG. 2. In some embodiments, the method may be performed by an apparatus (e.g., the apparatus 402/40T shown in FIG. 4 or FIG. 5).

At 302, the apparatus may calculate initial values of the rotation matrix and the translation vector of the current video frame captured by a camera of the apparatus. In some embodiments, the initial value of the rotation matrix of the current video frame may be calculated based on the rotation matrix of a previous video frame. In some embodiments, the initial value of the translation vector of the current video frame may be calculated based on the refined linear velocity corresponding to the current video frame.

At 304, the apparatus may select the nearest key frame of the current video frame. In some embodiments, to select the nearest key frame, the apparatus may select a plurality of key frames with the smallest center distance to the current video frame, and select a key frame of the plurality of key frames with an observation angle that is most similar to that of the current video frame as the nearest key frame.

At 306, the apparatus may refine the pose corresponding to the current video frame using feature points in a common captured region between the current video frame and the nearest key frame. In some embodiments, to refine the pose corresponding to the current video frame, the apparatus may solve an optimization problem using inverse compositional Lucas-Kanade algorithm, and determine optimized values of the rotation matrix and the translation vector of the current video frame.

Figure 4:
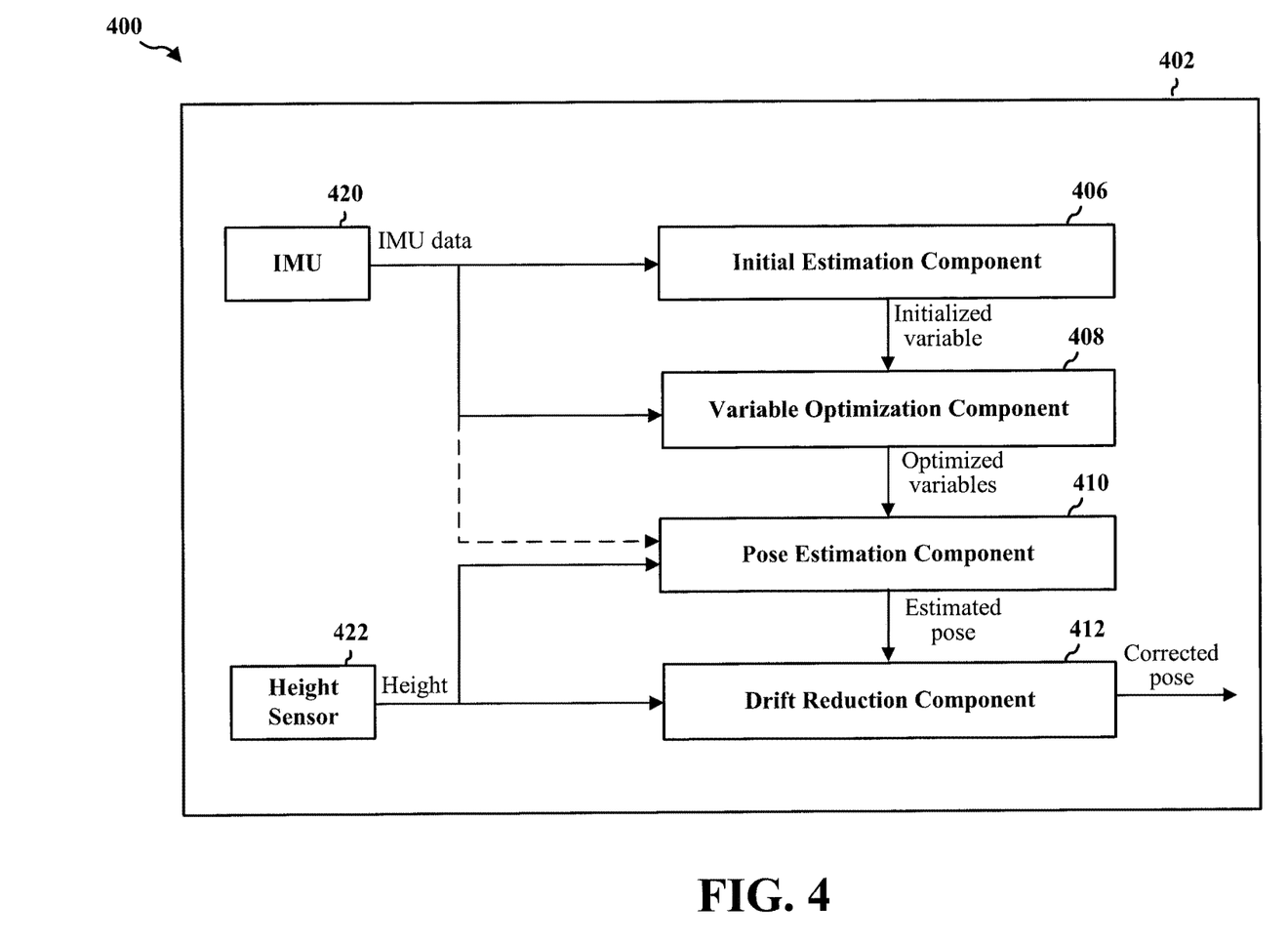
FIG. 4 is a conceptual data flow diagram illustrating the data flow between different means/components in an exemplary apparatus.

FIG. 4 is a conceptual data flow diagram 400 illustrating the data flow between different means/components in an exemplary apparatus 402. In some embodiments, the apparatus 402 may be an unmanned vehicle (e.g., UAV or AGV).

The apparatus 402 may include an initial estimation component 406 that estimates the initial values of the variables at least partially based on IMU data provided by the IMU 420. In one embodiment, the initial estimation component 406 may perform the operations described above with reference to 206 in FIG. 2.

The apparatus 402 may include a variable optimization component 408 that refines the initialized variables via solving an optimization problem. The initialized variables may be provided by the initial estimation component 406 and the IMU 420. In one embodiment, the variable optimization component 408 may perform the operations described above with reference to 208 or 210 in FIG. 2.

The apparatus 402 may include a pose estimation component 410 that estimates the initial pose of the apparatus corresponding to the current video frame captured by a camera of the apparatus. In some embodiments, the initial pose may be estimated based on the optimized variables provided by the variable optimization component 408 and the height of the apparatus provided by a height sensor 422. In some embodiments, the initial pose may be estimated further based on IMU data provided by the IMU 420. In one embodiment, the pose estimation component 410 may perform the operations described above with reference to 214 in FIG. 2.

The apparatus 402 may include a drift reduction component 412 that reduces the drift of the estimated pose using the nearest key frame. In some embodiments, the estimated pose may be corrected based on the height of the apparatus 402 provided by the height sensor 422. In one embodiment, the drift reduction component 412 may perform the operations described above with reference to 216 in FIG. 2.

The apparatus 402 may include additional components that perform each of the blocks of the algorithm in the aforementioned flowcharts of FIGS. 2 and 3. As such, each block in the aforementioned flowcharts of FIGS. 2 and 3 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 5:
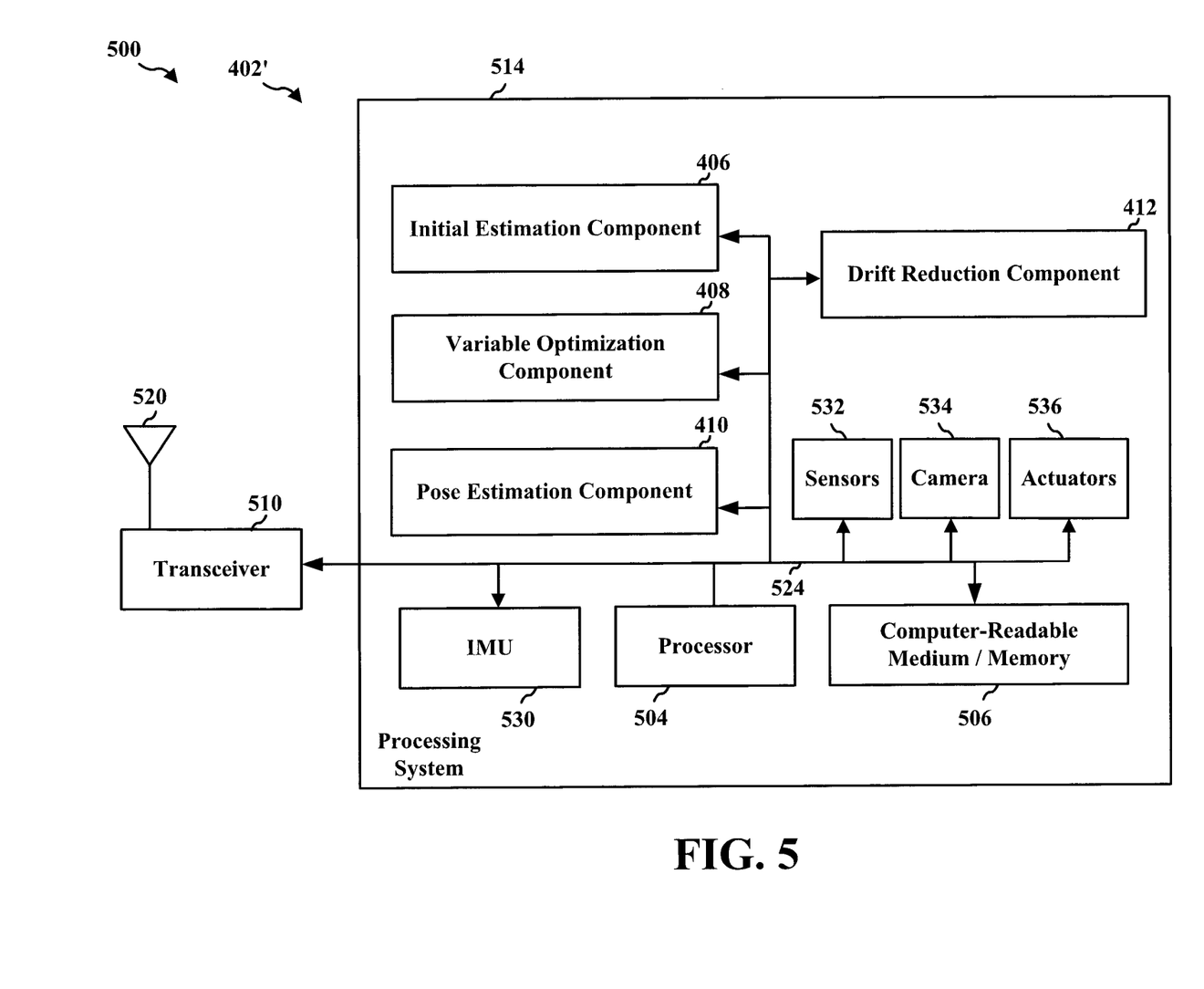
FIG. 5 is a diagram illustrating an example of a hardware implementation for an apparatus employing a processing system.

FIG. 5 is a diagram 500 illustrating an example of a hardware implementation for an apparatus 402' employing a processing system 514. In some embodiments, the apparatus 402' may be the apparatus 402 described above with reference to FIG. 4. The apparatus 402' may include one or more computing devices. The processing system 514 may be implemented with a bus architecture, represented generally by the bus 524. The bus 524 may include any number of interconnecting buses and bridges depending on the specific application of the processing system 514 and the overall design constraints. The bus 524 links together various circuits including one or more processors and/or hardware components, represented by the processor 504, the components 406, 408, 410, 412, the IMU 530, the sensors 532, the camera 534, the actuators 536, and the computer-readable medium/memory 506. The bus 524 may also link various other circuits such as timing sources, peripherals, voltage regulators, and power management circuits, which are well known in the art, and therefore, will not be described any further.

The processing system 514 may be coupled to a transceiver 510. The transceiver 510 is coupled to one or more antennas 520. The transceiver 510 provides a means for communicating with various other apparatus over a transmission medium. The transceiver 510 receives a signal from the one or more antennas 520, extracts information from the received signal, and provides the extracted information to the processing system 514. In addition, the transceiver 510 receives information from the processing system 514, and based on the received information, generates a signal to be applied to the one or more antennas 520.

The processing system 514 includes a processor 504 coupled to a computer-readable medium/memory 506. The processor 504 is responsible for general processing, including the execution of software stored on the computer-readable medium/memory 506. The software, when executed by the processor 504, causes the processing system 514 to perform the various functions described supra for any particular apparatus. The computer-readable medium/memory 506 may also be used for storing data that is manipulated by the processor 504 when executing software. The processing system 514 further includes at least one of the components 406, 408, 410, 412. The components may be software components running in the processor 504, resident/stored in the computer readable medium/memory 506, one or more hardware components coupled to the processor 504, or some combination thereof.

The IMU 530 may measure and report the angular velocity and linear acceleration of the apparatus 402'. The sensors 532 may include a height sensor and some other sensors. The camera 534 may capture images or video frames, which can be analyzed in localization. The actuators 536 may include digital electronic speed controllers (which control the RPM of the motors) linked to motors/engines and propellers, servomotors (for planes and helicopters mostly), weapons, payload actuators, LEDs and speakers.

In the following, various aspects of this disclosure will be illustrated:

Example 1 is a method or apparatus for localization via visual inertial odometry. The apparatus may be an unmanned vehicle. The apparatus may determine a first linear velocity of the apparatus and a first rotation matrix corresponding to a first video frame captured by a camera of the apparatus. The apparatus may estimate a second linear velocity of the apparatus corresponding to a second video frame captured by the camera based on the first linear velocity, the first rotation matrix, and the angular velocity of the apparatus corresponding to the second video frame. The angular velocity may be provided by an inertial measurement unit of the apparatus. The apparatus may construct an optical flow based on feature points across the first video frame and the second video frame. The apparatus may refine the angular velocity and the second linear velocity via solving a quadratic optimization problem constructed based on the optical flow, the estimated second linear velocity, and the angular velocity provided by the inertial measurement unit. The apparatus may estimate a pose of the apparatus corresponding to the second video frame based on the refined angular velocity and the refined second linear velocity.

In Example 2, the subject matter of Example 1 may optionally include that the apparatus may further reduce the drift of the estimated pose corresponding to the second video frame using the nearest key frame of the second video frame.

In Example 3, the subject matter of Example 2 may optionally include that the nearest key frame of the second video frame may be a key frame that shares the largest captured region with the second video frame.

In Example 4, the subject matter of any one of Examples 2 to 3 may optionally include that, to reduce the drift of the estimated pose, the apparatus may calculate initial values of a second rotation matrix and translation vector of the second video frame, select the nearest key frame of the second video frame, and refine the pose corresponding to the second video frame using feature points in a common captured region between the second video frame and the nearest key frame.

In Example 5, the subject matter of Example 4 may optionally include that the initial value of the second rotation matrix of the second video frame may be calculated based on the first rotation matrix of the first video frame.

In Example 6, the subject matter of any one of Examples 4 to 5 may optionally include that the initial value of the translation vector of the second video frame may be calculated based on the refined second linear velocity corresponding to the second video frame.

In Example 7, the subject matter of any one of Examples 4 to 6 may optionally include that, to select the nearest key frame, the apparatus may select a plurality of key frames with the smallest center distance to the second video frame, and select a key frame of the plurality of key frames with an observation angle that is most similar to that of the second video frame as the nearest key frame.

In Example 8, the subject matter of any one of Examples 4 to 7 may optionally include that, to refine the pose corresponding to the second video frame, the apparatus may solve an optimization problem using inverse compositional Lucas-Kanade algorithm, and determine optimized values of the second rotation matrix and the translation vector of the second video frame.

In Example 9, the subject matter of any one of Examples 2 to 8 may optionally include that the drift of the estimated pose corresponding to the second video frame may be reduced using the height of the apparatus corresponding to the second video frame.

In Example 10, the subject matter of any one of Examples 1 to 9 may optionally include that the second linear velocity may be estimated further based on the linear acceleration of the unmanned vehicle corresponding to the second video frame, the linear acceleration provided by the inertial measurement unit of the unmanned vehicle, where the linear acceleration and the angular velocity may be assumed to be constant.

A person skilled in the art will appreciate that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of localization via visual inertial odometry using an unmanned vehicle, the unmanned vehicle having a camera, an inertial measurement unit, and at least one processor, the method comprising:
    capturing a first video frame and a second video frame by a camera of the unmanned vehicle;
    measuring an angular velocity of the unmanned vehicle corresponding to the second video frame by an inertial measurement unit of the unmanned vehicle;
    the at least one processor configured to:
        determine a first linear velocity of the unmanned vehicle and a first rotation matrix corresponding to the first video frame;
        estimate a second linear velocity of the unmanned vehicle corresponding to the second video frame based on the first linear velocity, the first rotation matrix, and the angular velocity;
        construct an optical flow based on feature points across the first video frame and the second video frame;
        refine the angular velocity and the second linear velocity via solving a quadratic optimization problem constructed based on the optical flow, the estimated second linear velocity, and the angular velocity;
        estimate a pose of the unmanned vehicle corresponding to the second video frame based on the refined angular velocity and the refined second linear velocity; and
        utilize the estimated pose to assist operation of the unmanned vehicle.

2. The method of claim 1, further comprising:
    reducing a drift of the estimated pose corresponding to the second video frame using a nearest key frame of the second video frame.

3. The method of claim 2, wherein the nearest key frame of the second video frame is a key frame that shares a largest captured region with the second video frame.

4. The method of claim 2, wherein the reducing of the drift of the estimated pose comprises:
    calculating initial values of a second rotation matrix and translation vector of the second video frame;
    selecting the nearest key frame of the second video frame; and
    refining the pose corresponding to the second video frame using feature points in a common captured region between the second video frame and the nearest key frame.

5. The method of claim 4, wherein the initial value of the second rotation matrix of the second video frame is calculated based on the first rotation matrix of the first video frame.

6. The method of claim 4, wherein the initial value of the translation vector of the second video frame is calculated based on the refined second linear velocity corresponding to the second video frame.

7. The method of claim 4, wherein the selecting of the nearest key frame comprises:
   selecting a plurality of key frames with a smallest center distance to the second video frame; and
   selecting a key frame of the plurality of key frames with an observation angle that is most similar to that of the second video frame as the nearest key frame.

8. The method of claim 4, wherein the refining of the pose corresponding to the second video frame comprises:
   solving an optimization problem using an inverse compositional Lucas-Kanade algorithm; and
   determining optimized values of the second rotation matrix and the translation vector of the second video frame.

9. The method of claim 2, wherein the drift of the estimated pose corresponding to the second video frame is reduced using a height of the unmanned vehicle corresponding to the second video frame.

10. The method of claim 1, wherein the second linear velocity is estimated further based on a linear acceleration of the unmanned vehicle corresponding to the second video frame, the linear acceleration provided by the inertial measurement unit of the unmanned vehicle, wherein the linear acceleration and the angular velocity are assumed to be constant.

11. An unmanned vehicle for localization via visual inertial odometry, the unmanned vehicle comprising:
   a camera configured to capture a first video frame and a second video frame;
   an inertial measurement unit configured to measure an angular velocity of the unmanned vehicle corresponding to the second video frame; and
   at least one processor configured to:
      determine a first linear velocity of the unmanned vehicle and a first rotation matrix corresponding to the first video frame;
      estimate a second linear velocity of the unmanned vehicle corresponding to the second video frame based on the first linear velocity, the first rotation matrix, and the angular velocity;
      construct an optical flow based on feature points across the first video frame and the second video frame;
      refine the angular velocity and the second linear velocity via solving a quadratic optimization problem constructed based on the optical flow, the estimated second linear velocity, and the angular velocity;
      estimate a pose of the unmanned vehicle corresponding to the second video frame based on the refined angular velocity and the refined second linear velocity; and
      utilize the estimated pose to assist operation of the unmanned vehicle.

12. The unmanned vehicle of claim 11, wherein the at least one processor is further configured to:
   reduce a drift of the estimated pose corresponding to the second video frame using a nearest key frame of the second video frame.

13. The unmanned vehicle of claim 12, wherein the nearest key frame of the second video frame is a key frame that shares a largest captured region with the second video frame.

14. The unmanned vehicle of claim 12, wherein, to reduce the drift of the estimated pose, the at least one processor is configured to:
   calculate initial values of a second rotation matrix and translation vector of the second video frame;
   select the nearest key frame of the second video frame; and
   refine the pose corresponding to the second video frame using feature points in a common captured region between the second video frame and the nearest key frame.

15. The unmanned vehicle of claim 14, wherein the initial value of the second rotation matrix of the second video frame is calculated based on the first rotation matrix of the first video frame.

16. The unmanned vehicle of claim 14, wherein the initial value of the translation vector of the second video frame is calculated based on the refined second linear velocity corresponding to the second video frame.

17. The unmanned vehicle of claim 14, wherein, to select the nearest key frame, the at least one processor is configured to:
   select a plurality of key frames with a smallest center distance to the second video frame; and
   select a key frame of the plurality of key frames with an observation angle that is most similar to that of the second video frame as the nearest key frame.

18. The unmanned vehicle of claim 14, wherein, to refine the pose corresponding to the second video frame, the at least one processor is configured to:
   solve an optimization problem using an inverse compositional Lucas-Kanade algorithm; and
   determine optimized values of the second rotation matrix and the translation vector of the second video frame.

19. A non-transitory computer-readable medium storing computer executable code, comprising instructions for:
   determining a first linear velocity of an unmanned vehicle and a first rotation matrix corresponding to a first video frame captured by a camera of the unmanned vehicle;
   estimating a second linear velocity of the unmanned vehicle corresponding to a second video frame captured by the camera based on the first linear velocity, the first rotation matrix, and an angular velocity of the unmanned vehicle corresponding to the second video frame, the angular velocity provided by an inertial measurement unit of the unmanned vehicle;
   constructing an optical flow based on feature points across the first video frame and the second video frame;
   refining the angular velocity and the second linear velocity via solving a quadratic optimization problem constructed based on the optical flow, the estimated second linear velocity, and the angular velocity provided by the inertial measurement unit;
   estimating a pose of the unmanned vehicle corresponding to the second video frame based on the refined angular velocity and the refined second linear velocity; and
   utilizing the estimated pose to assist operation of the unmanned vehicle.

20. The non-transitory computer-readable medium of claim 19, wherein the computer executable code further comprises instructions for:
   reducing a drift of the estimated pose corresponding to the second video frame using a nearest key frame of the second video frame.

* * * * *